United States Patent
Lev et al.

(10) Patent No.: US 11,200,810 B2
(45) Date of Patent: Dec. 14, 2021

(54) DRONE COLLISION AVOIDANCE

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 347 days.

(21) Appl. No.: 16/278,771

(22) Filed: Feb. 19, 2019

(65) Prior Publication Data
US 2020/0265731 A1 Aug. 20, 2020

(51) Int. Cl.
*G08G 5/04* (2006.01)
*G08G 5/00* (2006.01)
*B64C 39/02* (2006.01)
*B64D 47/08* (2006.01)

(52) U.S. Cl.
CPC .......... *G08G 5/045* (2013.01); *B64C 39/024* (2013.01); *B64D 47/08* (2013.01); *G08G 5/0034* (2013.01); *B64C 2201/123* (2013.01); *B64C 2201/126* (2013.01); *B64C 2201/127* (2013.01); *B64C 2201/128* (2013.01); *B64C 2201/141* (2013.01); *B64C 2201/18* (2013.01)

(58) Field of Classification Search
CPC .... G08G 5/045; G08G 5/0034; B64C 39/024; B64C 2201/123; B64C 2201/126; B64C 2201/127; B64C 2201/128; B64C 2201/141; B64C 2201/18; B64D 47/08

USPC ........................................................ 701/120
See application file for complete search history.

(56) References Cited

U.S. PATENT DOCUMENTS

| | | | |
|---|---|---|---|
| 10,269,257 B1* | 4/2019 | Gohl | G06K 9/52 |
| 2015/0362917 A1* | 12/2015 | Wang | G05D 1/0022 |
| | | | 701/2 |
| 2017/0053169 A1* | 2/2017 | Cuban | B64C 39/024 |
| 2017/0185867 A1* | 6/2017 | Lee | G06T 11/206 |
| 2017/0337791 A1* | 11/2017 | Gordon-Carroll | H04W 4/023 |
| 2018/0107211 A1* | 4/2018 | Schubert | G08G 5/0069 |
| 2019/0145780 A1* | 5/2019 | Thiercelin | G06F 11/3058 |
| | | | 701/430 |
| 2019/0317530 A1* | 10/2019 | Yang | G08G 5/0086 |
| 2020/0089965 A1* | 3/2020 | Hollander | G06N 3/08 |
| 2020/0103499 A1* | 4/2020 | Preece | G01S 13/867 |

* cited by examiner

*Primary Examiner* — Krishnan Ramesh

(57) ABSTRACT

A computer implemented method of planning a drone flight path to increase safety of dynamic objects the drone is estimated to encounter along the flight path based on a mobility model constructed to predict movement of dynamic objects, comprising receiving sensory data captured over time by one or more sensors monitoring movement of a plurality of dynamic objects in a certain geographical area, analyzing the sensory data to identify one or more mobility patterns of one or more dynamic objects detected in the certain geographical area, updating a mobility model with the mobility pattern(s) and generating a planned flight path based on the mobility model for one or more drones planned to fly in the certain geographical area, the flight path is planned to maintain a predefined safety space between the drone(s) and the dynamic object(s).

23 Claims, 2 Drawing Sheets

DRONE COLLISION AVOIDANCE

FIELD AND BACKGROUND OF THE INVENTION

Figure 1:
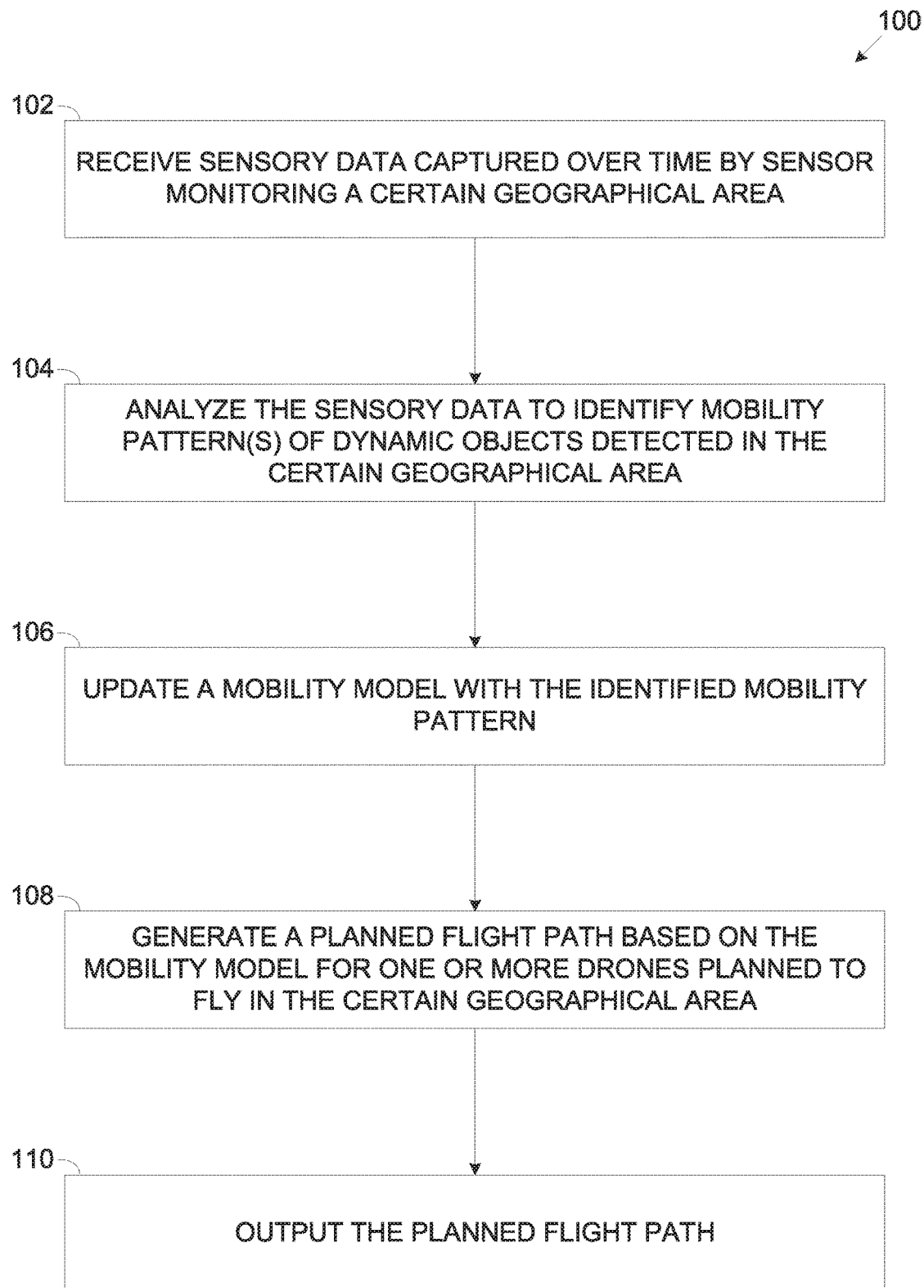

The present invention, in some embodiments thereof, relates to planning a flight path for a drone, and, more specifically, but not exclusively, to planning a flight path for a drone to increases safety of dynamic objects the drone is estimated to encounter along its flight path based on a mobility model constructed to predict movement of the dynamic objects.

In the past drones have been mainly used for military application. However in recent years the use of drones is rapidly spreading for a plurality of civilian non-military applications, platforms and services and is expected to dramatically increase in the future.

The drones present an efficient cost effective platform for covering large distances and providing aerial view and mobility making the drones highly suitable for a plurality of applications. Such applications range from filming and photography for mapping and monitoring (e.g. law enforcement, safety inspection, archeological surveys, agriculture, weather, etc.) through shipping and delivery to disaster management, rescue operations and healthcare to name a few.

While the drones are gaining extreme popularity, regulatory directives and enforcement are lagging behind thus presenting major roadblocks for the advancement, utilization and deployment of the drones, specifically in highly populated urban areas where the drones may present a safety hazard to people, animals, vehicles and/or the like which populate these areas.

SUMMARY OF THE INVENTION

According to a first aspect of the present invention there is provided a computer implemented method of planning a drone flight path to increase safety of dynamic objects the drone is estimated to encounter along the flight path based on a mobility model constructed to predict movement of dynamic objects, comprising:
  Receiving sensory data captured over time by one or more sensors monitoring movement of a plurality of dynamic objects in a certain geographical area.
  Analyzing the sensory data to identify one or more mobility patterns of one or more dynamic objects detected in the certain geographical area.
  Updating a mobility model with the mobility pattern(s).
  Generating a planned flight path based on the mobility model for one or more drones planned to fly in the certain geographical area. The flight path is planned to maintain a predefined safety space between the drone(s) and the dynamic object(s).

According to a second aspect of the present invention there is provided a system for planning a drone flight path to increase safety of dynamic objects the drone is estimated to encounter along the flight path based on a mobility model constructed to predict movement of dynamic objects, comprising:
  A program store storing a code.
  One or more processors coupled to the program store for executing the stored code. The code comprising:
    Code instruction to receive sensory data captured over time by one or more sensors monitoring movement of a plurality of dynamic objects in a certain geographical area.
    Code instruction to analyze the sensory data to identify one or more mobility patterns of one or more dynamic objects detected in the certain geographical area.
    Code instruction to update a mobility model with the one or more mobility patterns.
    Code instruction to generate a planned flight path based on the mobility model for one or more drones planned to fly in the certain geographical area. The flight path is planned to maintain a predefined safety space between the drone(s) and the dynamic object(s).

According to a third aspect of the present invention there is provided a computer implemented method of planning a drone flight path to increase safety of dynamic objects the drone is estimated to encounter along the flight path based on a mobility model constructed to predict movement of dynamic objects, comprising:
  Receiving sensory data captured over time by one or more sensors monitoring movement of a plurality of dynamic objects in one or more geographical areas characterized by one or more area characteristics.
  Analyzing the sensory data to identify one or more mobility patterns of one or more dynamic objects detected in the geographical area(s).
  Updating a mobility model with the mobility pattern(s).
  Generating a planned flight path based on the mobility model for one or more drones planned to fly in another geographical area sharing the one or more of the area characteristics with the geographical area(s). The flight path is planned to maintain a predefined safety space between the drone(s) and the dynamic object(s).

In a further implementation form of the first, second and/or third aspects, the planned flight path defines a tubular space along having predefined boundaries in a vertical axis and/or a horizontal axis with respect to ground in which the drone is permitted to fly.

In a further implementation form of the first, second and/or third aspects, the predefined safety space is defined to prevent damage to the dynamic object(s) resulting from a collision with the drone(s), a hit of one or more parts disintegrated from the drone(s) and/or a hit of one or more parts of another object disintegrated as result of a collision with the drone(s).

In a further implementation form of the first, second and/or third aspects, the dynamic objects comprise a human, an animal, a vehicle, machinery and/or a moving road infrastructure object.

In a further implementation form of the first, second and/or third aspects, each of the one or more sensors is a member of a group consisting of: an imaging sensor, a laser detection and ranging (LiDAR) sensor, a radio detection and ranging (RADAR) sensor and a sound navigation and ranging (SONAR) sensor.

In a further implementation form of the first, second and/or third aspects, one or more of the sensors are statically deployed in the certain geographical area.

In a further implementation form of the first, second and/or third aspects, one or more of the sensors are mounted in one or more aerial vehicles flying over the certain geographical area. The aerial vehicles may include a drone, an unmanned aerial vehicle, a manned aerial vehicle and/or a satellite.

In a further implementation form of the first, second and/or third aspects, each of the identified mobility patterns defines a location, a direction and/or a speed.

In an optional implementation form of the first, second and/or third aspects, one or more of the mobility patterns is adjusted in the mobility model according to one or more temporal parameters associated with the movement of one or more of the dynamic objects. The temporal parameters may include a time of day, a day of week and/or a date.

In an optional implementation form of the first, second and/or third aspects, one or more of the mobility patterns is adjusted in the mobility model according to one or more environmental conditions associated with the movement of one or more of the dynamic objects. The environmental conditions may include a temperature and/or a weather condition.

In an optional implementation form of the first, second and/or third aspects, the analysis of the sensory data includes one or more machine learning algorithms applied to the sensory data for detecting one or more of the mobility patterns.

In an optional implementation form of the first, second and/or third aspects, the mobility model is adjusted according to one or more area restrictions in the certain geographical area. The area restrictions may include a no fly zone in which the drone is not allowed to fly and/or a safe flight zone in which the drone is allowed to fly with no restrictions.

In an optional implementation form of the first, second and/or third aspects, the mobility model is adjusted according to one or more flight planning rules predefined to ensure compliance of the flight path with one or more regulation restrictions. The regulation restrictions may include a privacy right, a noise restriction and/or a public safety.

In an optional implementation form of the first, second and/or third aspects, the mobility model is adjusted to include one or more mobility patterns of one or more dynamic objects which potentially emerge from one or more entry points detected in the certain geographical area based on the analysis of the sensory data. The entry points may include a doorway, a hallway and/or a street corner.

In an optional implementation form of the first, second and/or third aspects, the flight plan is adjusted to follow an elevated path tracking a human movement path defined by the mobility model.

In an optional implementation form of the first, second and/or third aspects, the flight plan is constructed to define one or more emergency actions to be applied by one or more of the drone(s) in case the predefined safety space cannot be maintained. The emergency actions may include an immediate emergency landing, moving to a predefined altitude, operating one or more collision measure and/or operating one or more signaling measure to indicate presence of the drone.

In a further implementation form of the first, second and/or third aspects, one or more of the emergency actions are defined according to one or more of: a map of the certain geographical area, a model of the certain geographical area, a plan of public transportation in the certain geographical area and/or the analysis of the sensory data captured in the certain geographical area.

In a further implementation form of the first, second and/or third aspects, one or more segments of the planned flight path is generated by one or more of the drone(s) while in flight based on the mobility model. Each of the one or more segments of the planned flight defines a future route of the drone during the current flight.

In a further implementation form of the first, second and/or third aspects, the mobility model is updated according to sensory data captured during the current flight by at last one sensor mounted on the drone.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
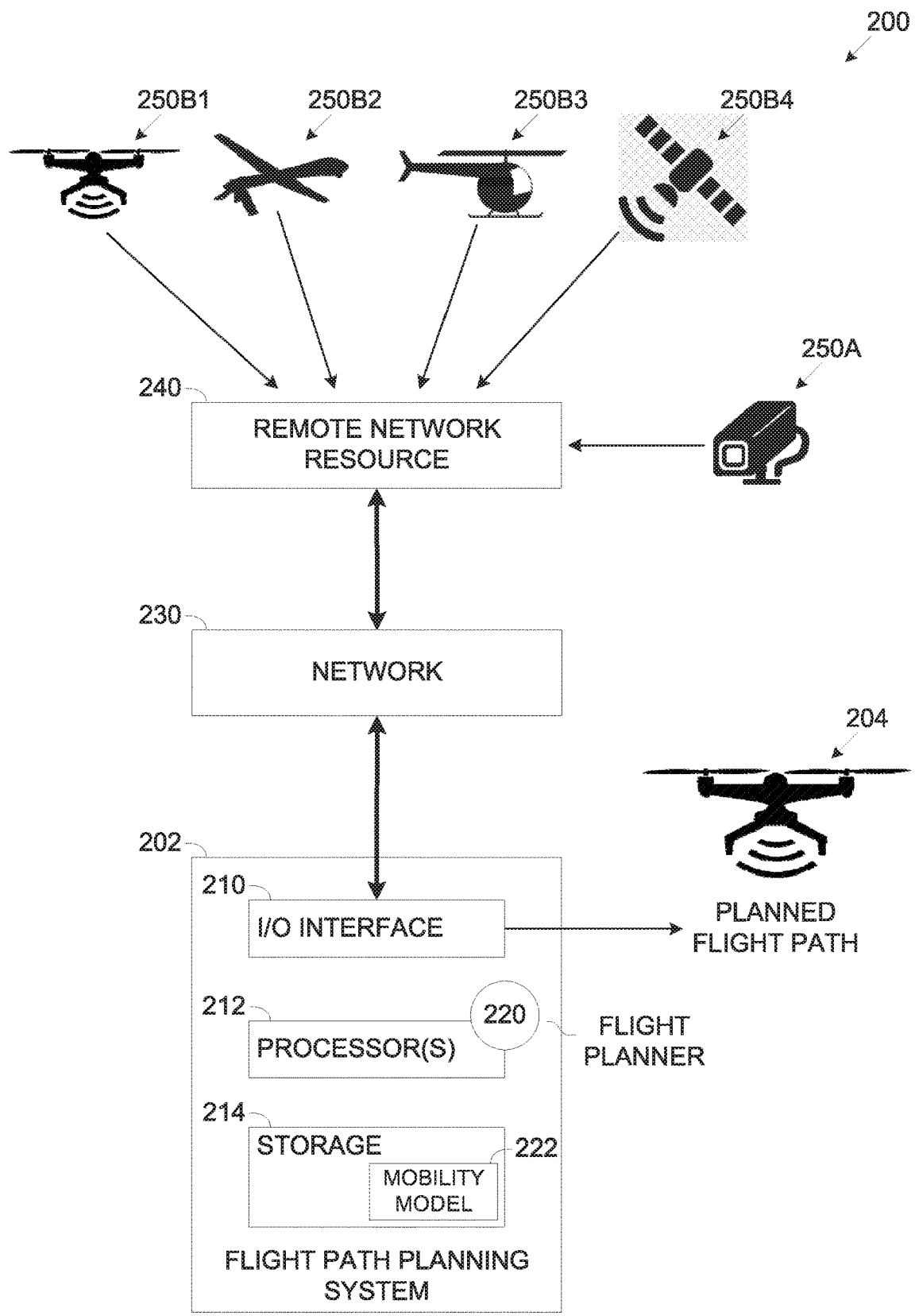

In the drawings:

FIG. 1 is a flowchart of an exemplary process of planning a flight path for a drone to increases safety for dynamic objects the drone is estimated to encounter along its flight path, according to some embodiments of the present invention; and FIG. 2 is a schematic illustration of exemplary systems for planning a flight path for a drone to increases safety for dynamic objects the drone is estimated to encounter along its flight path, according to some embodiments of the present invention.

DESCRIPTION OF SPECIFIC EMBODIMENTS
OF THE INVENTION

The present invention, in some embodiments thereof, relates to planning a flight path for a drone, and, more specifically, but not exclusively, to planning a flight path for a drone to increases safety of dynamic objects the drone is estimated to encounter along its flight path based on a mobility model constructed to predict movement of the dynamic objects.

According to some embodiments of the present invention, there are provided methods, systems and computer program products for planning in advance a flight path for one or more drones planned to fly over a certain geographical area to increase safety of one or more dynamic objects, for example, a human, an animal, a vehicle, machinery and/or the like by reducing probability for the drone to inflict damage and/or injury to the dynamic objects. The flight path may define a tubular space along the planned flight path having predefined boundaries in the vertical axis and/or in the horizontal axis (with respect to the ground) in which the drone is permitted to fly. As such the drone may adjust its flight path during its flight to avoid obstacles, specifically to avoid colliding with dynamic object(s) detected in real-time along the planned flight path while remaining within the tubular space defined by the planned flight path.

The flight path is planned based on a mobility model generated to predict movement of the dynamic objects in the certain geographical area. The mobility model which may include information, for example, location, dimensions, height, and/or the like relating to static objects present in the certain geographical area, for example, roads, streets, sidewalks, buildings, landmarks, vegetation and/or the like is enhanced to include predicted movement of the dynamic objects which may be present in the certain geographical area. The static objects information may be derived from analysis of data relating to the certain geographical area, for example, map(s), model(s), captured sensory data (e.g. images, video, depth data, etc.) and/or the like. The movement of the dynamic objects may be predicted based on one or more mobility patterns identified for the dynamic objects observed over prolonged time periods, for example, days, weeks, months or years.

One or more sensors of one or more technologies, for example, an imaging sensor (e.g. a camera, a video camera, a thermal imaging device, an infrared sensor, etc.), a Laser Detection and Ranging (LiDAR) sensor, a Radio Detection and Ranging (RADAR) sensor and a Sound Navigation and Ranging (SONAR) sensor and/or the like may be deployed to monitor the certain geographical area to capture sensory data. The sensors may be statically deployed in the geographical area and/or mounted on one or more vehicles, specifically aerial vehicles, for example, a drone, an Unmanned Aerial Vehicle (UAV), a manned aerial vehicle (e.g. plane, helicopter, etc.), a satellite and/or the like flying over the certain geographical area. The type, nature and/or characteristics of the sensory data may naturally depend on the capturing sensor technology and may include, for example, imagery data (e.g. images, video streams, thermal maps, etc.), depth data (e.g. depth maps, blob maps, etc.) and/or the like.

The sensory data collected over the prolonged time period may be analyzed to detect dynamic object(s) moving in the certain geographical area and to further identify the mobility pattern(s) of the detected dynamic object(s). One or more analysis tools may be applied to analyze the sensory data, for example, image processing and computer vision tools, signal processing tools, depth analysis tools and/or the like which may be selected according to the type, nature and/or characteristics of the captured sensory data.

Optionally, one or more of the mobility patterns are generated, adjusted and/or adapted according to one or more temporal parameters associated with the movement of the dynamic object(s) detected in the certain geographical area, for example, a time of day, a day of week, a date and/or the like.

Optionally, Optionally, one or more of the mobility patterns are generated, adjusted and/or adapted according to one or more environmental conditions associated with the movement of the dynamic object(s) detected in the certain geographical area, for example, a temperature, weather conditions (e.g. sun, rain, hail, snow and/or the like.

Optionally, one or more machine learning algorithms, models and/or the like trained to detect the dynamic objects in the sensory data are applied to identify the mobility pattern(s) of the dynamic objects detected in the certain geographical area.

The mobility pattern(s) may be incorporated into the mobility model to enhance the mobility model to include the predicted movement of the dynamic object(s) on top the information available for the static objects present in the certain geographical area.

Incorporating the mobility pattern(s) into the mobility model may yield a comprehensive model generated and adapted for the certain geographical area to predict movement of the dynamic objects in the certain geographical area based on the identified and learned mobility patterns of the dynamic objects characteristic to the certain geographical area.

Optionally, the mobility model is generated, adjusted and/or adapted according to one or more area restrictions applicable for the certain geographical area, specifically a no fly zone where drone are not allowed to fly, a safe flight zone where the drone may fly unrestricted and/or the like.

Optionally, the mobility model is generated, adjusted and/or adapted according to one or more flight planning rules for ensuring compliance of the drone flight with one or more regulation restrictions, for example, a privacy right, a noise restriction and/or the like which may apply in the certain geographical area.

Optionally, the mobility model is generated, adjusted and/or adapted to apply one or more of the mobility patterns for predicting movement of one or more dynamic object which may emerge from one or more entry points, for example, a doorway, a hallway, a street corner and/or the like detected (based on the analysis of the sensory data) in the certain geographical area.

Based on the mobility model, specifically based on the mobility pattern(s) identified for the dynamic objects in the certain geographical area, a planned flight path may be generated for one or more drones planned to fly in the certain geographical area. Moreover, the planned flight path may be adjusted according to one or more of the mobility pattern(s) applicable for the temporal parameters and/or the environmental conditions identified and/or predicted for the flight of the drone in the certain geographical area. Furthermore, the planned flight path may be adjusted according to one or more of the area restrictions and/or flight planning rules defined by the mobility model.

The generated flight path is planned to maintain a predefined safety space between the drone(s) and dynamic object(s) which may be present in the certain geographical area. The safety space is predefined to prevent damage and/or injury to the dynamic object(s) which may result from, for example, a collision with the drone, a hit of part(s) (e.g. rotor, body, etc.) disintegrated from the drone, a hit of part(s) of another object (e.g. building, power pole, communication tower, traffic sign, etc.) disintegrated as result of a collision with the drone and/or the like.

Optionally, the planned flight path dictates one or more emergency actions the drone(s) is directed to apply in case of an emergency situation in which the drone is unable to maintain the planned flight path. The emergency actions may include, for example, an immediate emergency landing, moving to a predefined altitude, operating one or more collision measures to prevent damage and/or injury to an object hit by the drone, operating one or more signaling measures to indicate presence of the drone to the dynamic objects. in particular, the emergency actions are dictated based on data collected for the certain geographical area, for example, the map(s), the model, the sensory data (e.g. images, video, depth data) and/or the like coupled with the mobility patterns defined in the mobility model.

According to some embodiments of the present invention, there are provided methods, systems and computer program products for planning in advance a flight path for one or more drones planned to fly in a certain (first) geographical area based on a mobility model generated based on sensory data captured in one or more other (second) geographical area sharing one or more area characteristics with the certain geographical area. The area characteristic(s) may be identified by analyzing the captured sensory data and/or by analyzing the documented data relating to the certain geographical area and/or to the other geographical areas, for example, map(s), models(s) and/or the like. The area characteristics may include general area characteristics (e.g. urban area, rural area, residential area, commercial area, industrial area, etc.), static objects characteristics (e.g. building types, streets structure, power lines deployment, etc.), dynamic objects characteristics (e.g. vehicles traffic density, pedestrians' volume, public transportation vehicles, etc.) and/or the like.

The mobility model may include one or more mobility patterns identified and/or learned based on the sensory data captured by one or more sensors deployed to monitor one or more of the other geographical areas using the methods and techniques described herein before. Based on the mobility model one or more flight paths may be planned for one or more drones planned to fly in the certain geographical area which is different than the other geographical area(s) monitored by the sensors to produce the mobility model but shares one or more of the area characteristics identified for the other geographical area(s). Since the certain geographical area shares area characteristic(s) with the other geographical area(s), the mobility model constructed for the other geographical area(s) may be highly accurate and suitable for predicting the dynamic objects movement in the certain geographical area.

According to some embodiments of the present invention, the planned flight path generated for one or more drones is created and/or adjusted by the drone(s) based on the mobility model while the drone(s) is in flight. The drone may plan one or more segments of the flight path for a future route of the drone during the current flight, for example, the route the drone may follow in several seconds, in several minutes and/or the like from the time of planning the flight path segment.

Optionally, the mobility model is updated while the drone is in flight by generating, updating and/or adjusting one or more of the mobility patterns according to an analysis of sensory data captured during the current flight by one or more sensors, for example, an imaging sensor, a LiDAR sensor, a RADAR sensor, a SONAR sensor and/or the like mounted on the drone.

Planning the flight path for the drones in advance based on the mobility model comprising the identified and learned mobility patterns of the dynamic objects characteristic to the certain geographical area may present significant advantages and benefits compared to currently existing methods and systems for planning drone flight path plans. First, by identifying and mobility patterns characteristic to the certain geographical area, the drone planned flight path may be generated to maintain the predefined safety space between the drone(s) and dynamic object(s) predicted to be present in the certain geographical area. This may significantly reduce the probability and potentially prevent for the drone to inflict damage and/or injury to the dynamic object(s).

Moreover, planning the drone flight path in advance based on the mobility model may significantly reduce the probability for the drone to encounter emergency situations since the drone may avoid flying next to the dynamic object(s). Furthermore, in case the drone does encounter an emergency situation, the emergency operations dictated in advance based on the mobility model may minimize and potentially prevent damage and/or injury to the dynamic object(s).

Furthermore, combined together, flight path planned in advance and the emergency actions and measures dictated in advance may significantly improve compliance with regulation directives thus significantly simplify deployment of the drones, specifically in urban areas thus allowing the use of the drones for a plurality of applications, such as filming and photography, mapping, monitoring, shipping and delivery, disaster management, rescue operations, healthcare and/or the like.

In addition, by using the mobility model constructed for one geographical area to generated planned flight paths for drones planned to fly in another geographical area sharing similar area characteristics, the mobility model(s) may be reused for geographical areas other than those the models are constructed for. This may significantly reduce the resources, for example, sensors deployment, analysis computing resources, analysis storage resources, analysis time and/or the like since the mobility model(s) may be constructed for a limited number of geographical areas rather than all geographical areas and applied to other geographical areas characterized by similar area characteristics.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of planning a flight path for a drone to increases safety for dynamic objects the drone is estimated to encounter along its flight path, according to some embodiments of the present invention. An exemplary process 100 may be executed to plan a flight path for one or more drones planned to fly over a certain geographical area to increase safety of one or more dynamic objects, for example, a human, an animal, a vehicle, machinery and/or the like by reducing probability for the drone to inflict damage and/or injury to the dynamic objects.

The flight path is planned based on a mobility model generated to predict movement of the dynamic objects in the certain geographical area. The mobility model comprises one or more mobility patterns of the dynamic objects detected by analyzing sensory data captured over time by one or more sensors deployed to monitor the certain geographical area. The sensors may be statically deployed in the geographical area and/or mounted on one or more vehicles, specifically aerial vehicles which have conducted one or more flights over the certain geographical area.

The flight plan may be provided, delivered and/or uploaded to one or more drone(s) which may apply the flight plan and set their flight path in the certain geographical area according the flight plan.

Optionally, the flight path may define a tubular space along the planned flight path having predefined boundaries in the vertical axis and/or in the horizontal axis (with respect to the ground) in which the drone is permitted to fly. In real-time during its flight, the drone may adjust its flight path to avoid obstacles, specifically to avoid colliding with dynamic object(s) detected in real-time along the planned flight path while remaining within the tubular space defined by the planned flight path.

The flight path is planned to maintain a predefined safety space between the drone and the dynamic object(s) to reduce and potentially eliminate the probability of the drone inflicting damage and/or injury to the dynamic object(s) as result of, for example, a collision with the drone, a hit of part(s) disintegrated from the drone, a hit of part(s) of other object(s) disintegrated as result of a collision with the drone and/or the like.

Reference is also made to FIG. 2, which is a schematic illustration of exemplary systems for planning a flight path for a drone to increases safety for dynamic objects the drone is estimated to encounter along its flight path, according to some embodiments of the present invention. An exemplary environment 200 includes an exemplary flight path planning system 202 which may be used for executing a process such as the process 100 to generate a flight path plan for one or more drones 204 planned to fly in a certain geographical area populated by one or more of the dynamic object which may potentially move in the certain geographical area.

The dynamic objects may include one or more living objects, for example, a human and/or an animal. The humans may include, for example, a. pedestrian, a bystander, a worker (e.g. a policeman, a mailman, a construction worker, etc.) and/or the like. The animals may include, for example, a bird (or flock of), a pet (e.g. a dog, a cat, etc.), a livestock animal (e.g. a cow, a goat, a horse, etc.), a wildlife animal and/or the like.

The dynamic objects may further include one or more dynamic inanimate objects, for example, a ground vehicle such as, for example, a car, a track, a bus, a train, a tram and/or the like. The dynamic inanimate objects may also include aerial and/or naval vehicles, for example, a plane, a helicopter, a drone, a ship, a boat, a raft and/or the like. The dynamic inanimate objects may further include one or more pieces of machinery, for example, a crane, a bascule bridge and/or the like. The dynamic inanimate objects may also include one or more moving road infrastructure object, for example, a railroad crossing barrier and/or the like.

The flight path planning system 202, for example, a server, a computing node, a cluster of computing nodes and/or the like may comprise an I/O interface 210, a processor(s) 212 and storage 214.

The I/O interface 210 may include one or more wired and/or wireless interfaces, for example, a Local area Network (LAN) interface, a Universal Serial Bus (USB) interface, a serial interface, a Radio Frequency (RF) interface, a Bluetooth interface, a Wireless LAN (WLAN) interface (e.g. Wi-Fi) and/or the like. Through the I/O interface 210, the flight path planning system 202 may communicate with one or more of the drones 204 to provide one or more planned flight paths to the drone(s) 204.

The I/O interface 210 may further include one or more wired and/or wireless interfaces for connecting to a network(s) 230, for example, a Local Area Network (LAN), a Wide Area Network (WAN), a Metropolitan Area Network (MAN), a cellular network, the internet and/or the like. Using the I/O interface 210, the flight path planning system 202 may communicate with one or more remote network resources 240, for example, a server, a computing node, a cluster of computing nodes, a cloud service, a cloud computing platform and/or the like. Specifically, the flight path planning system 202 may communicate with remote network resource(s) 240 to obtain sensory data depicting the certain geographical area.

The sensory data may be captured by one or more sensors 250 deployed to monitor the certain geographical area, for example, an imaging sensor (e.g. a camera, a video camera, a thermal imaging device, an infrared sensor, etc.), a LiDAR sensor, a RADAR sensor and a SONAR sensor and/or the like. The sensor(s) 250 may include one or more static sensors 250A deployed in the geographical area, for example, a street camera, a traffic camera and/or the like which may monitor at least part of the geographical area. One or more of the sensors 250 may be mobile sensors 250B mounted, installed, integrated and/or carried by one or more vehicles, specifically aerial vehicles, for example, a drone mounted sensor 250B1, a UAV mounted sensor 250B2, a manned aerial vehicle (e.g. plane, helicopter, etc.) mounted sensor 250B3, a satellite mounted sensor 250B4 and/or the like.

The flight path planning system 202 may obtain the sensory data by directly communicating with one or more of the sensors which are connected to the network 250, for example, a network camera, a satellite downlink and/or the like. Additionally and/or alternatively, the flight path planning system 202 communicates with one or more of the remote network resources 240 adapted to collect and locally store the sensory data captured by the sensors 250.

The processor(s) 212, homogenous or heterogeneous, may include one or more processors arranged for parallel processing, as clusters and/or as one or more multi core processor(s). The storage 214 may include one or more non-transitory persistent storage devices, for example, a hard drive, a Flash array and/or the like. The storage 206 may also include one or more volatile devices, for example, a Random Access Memory (RAM) component and/or the like. The program store 214 may further comprise one or more network storage devices, for example, a storage server, a Network Accessible Storage (NAS), a network drive and/or the like accessible through the I/O interface 210.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a flight planner 220 for generating a flight path plan for one or more for the drones 204. The flight planner 220 may further utilize one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like.

The flight planner 220 may generate, update and/or adjust a mobility model 222 which may be used for generating the flight path plan. The mobility model 222 may typically be locally stored at the flight path planning system 202, for example, in the storage 214. However, the mobility model 222 may be stored in one or more remote networked resources such as the remote network resources 240.

Optionally, the flight path planning system 202 and/or the flight planner 220 executed by the flight path planning system 202 are implemented as one or more cloud computing services, for example, an Infrastructure as a Service (IaaS), a Platform 9as a Service (PaaS), a Software as a Service (SaaS) and/or the like such as, for example, Amazon Web Service (AWS), Google Cloud, Microsoft Azure and/or the like.

As shown at 102, the process 100 starts with the flight planner 220 receiving the sensory data captured by the sensor(s) 250 deployed to monitor the certain geographical area. In particular, the sensory data obtained by the flight planner 220 is captured by the sensor(s) 250 over a prolonged period of time, for example, several days, several weeks, several months, several years and/or the like.

Moreover, the sensory data captured by the sensor(s) 250 may be associated with one or more temporal parameters relevant to the time of capturing the sensory data, for example, a time of day (day, night, rush hour, etc.), a day of week (e.g. working day, weekend, etc.), a date (e.g. season, holiday, etc.). The sensory data captured by the sensor(s) 250 may be further associated with one or more environmental conditions detected at the certain geographical area during the capturing the sensory data, for example, a physical condition (e.g. temperature, humidity, light, etc.), a weather condition (e.g. sun, clouds, rain, snow, hail, etc.) and/or the like.

The sensory data may comprise different data depending on the type and/or technology of the respective sensor(s) 250 which captured the sensory data. For example, the sensory data captured by an imaging type sensor 250 may include one or more images, a video sequence, a thermal map and/or the like. In another example, the sensory data captured by a LiDAR type sensor 250 may include a depth map and/or the like. In another example, the sensory data captured by a RADAR and/or SONAR type sensor 250 may include one or more blobs and/or the like.

As shown at 104, the flight planner 220 may analyze the sensory data collected over the prolonged period of time to detect one or more of the dynamic objects moving in the certain geographical area and further identify one or more mobility patterns of the dynamic objects detected in the geographical area.

The flight planner 220 may apply one or more analysis methods, techniques, tools and/or algorithms for analyzing the sensory data, specifically the flight planner 220 may apply appropriate analysis tools according to the type of the sensory data. For example, the flight planner 220 may apply one or more image processing techniques to analyze the sensory data captured by the imaging type sensor 250. In another example, the flight planner 220 may apply one or more depth analysis techniques to analyze the depth data captured by the LiDAR type sensor 250. In another example, the flight planner 220 may apply one or more signal processing tools for blobs analysis techniques to analyze the depth data captured by the RADAR type sensor 250 and/or the SONAR type sensor 250.

Based on the sensory data analysis, the flight planner 220 may detect the dynamic object(s) moving in the certain geographical area and may further identify and set mobility pattern(s) of the detected dynamic object(s). Each of the mobility patterns relates to one or more of the dynamic objects detected in the certain geographical area and defines the movement in terms of, for example, a location, a direction, a speed and/or the like.

For example, a certain mobility pattern identified and set by the flight planner 220 may define (indicate) that multiple pedestrians are walking in a north to south direction on a certain sidewalk in the certain geographical area at a certain speed, specifically an average speed computed for the multitude of pedestrians. In another example, a certain mobility pattern identified and set by the flight planner 220 may define (indicate) that multiple cars are riding eastward in a certain street in the certain geographical area at a certain speed, specifically an average speed computed for the multitude of cars. In another example, a certain mobility pattern identified and set by the flight planner 220 may define (indicate) that a crane is moving in a circular movement at a certain speed next to a certain building under construction in the certain geographical area. In another example, a certain mobility pattern identified by the flight planner 220 may define (indicate) that a certain bus line is following a certain consistent path at a certain average speed through the certain geographical area.

The flight planner 220 may further set, generate, adjust and/or modify one or more of the mobility patterns according to one or more of the temporal parameters associated with the analyzed sensory data. For example, a certain mobility pattern identified and set by the flight planner 220 may define (indicate) that during a certain time of the day (e.g. rush hour) multiple pedestrians are walking on a certain sidewalk in a west to east direction from a certain underground train station to a certain office building complex in the certain geographical area. In another example, a certain mobility pattern identified and set by the flight planner 220 may define (indicate) that during a certain time of the day (e.g. darkness) pedestrians are walking on a certain sidewalk adjacent to a lighted shopping mall façade while avoiding walking on the opposite dark sidewalk. In another example, a certain mobility pattern identified and set by the flight planner 220 may define (indicate) that during a certain day of the week (e.g. weekend) multiple pedestrians are walking on a certain sidewalk leading to a certain park in the certain geographical area.

The flight planner 220 may further set, generate, adjust and/or modify one or more of the mobility patterns according to one or more of the environmental condition associated with the analyzed sensory data. For example, a certain mobility pattern identified and set by the flight planner 220 may define (indicate) that when raining multiple pedestrians are walking on a certain sidewalk having an overhead shelter (e.g. roof, cover, etc.). In another example, a certain mobility pattern identified and set by the flight planner 220 may define (indicate) that during certain times of the day on a sunny day multiple pedestrians are walking on a certain shaded sidewalk while avoiding walking on the opposite sidewalk exposed to the sun.

Optionally, the flight planner 220 applies one or more machine learning methods, algorithm, models, techniques and/or the like, for example, a neural network, a support vector machine (SVM), a decision tree learning algorithm, a K-Nearest neighbors algorithm and/or any other learning algorithm as known in the art trained to identify one or more of the mobility patterns for the dynamic objects detected in the certain geographical area. The machine learning algorithm(s) may be trained and learned using a plurality of training datasets comprising sensory data captured in the certain geographical area and optionally captured in one or more other geographical areas. The machine learning algorithm(s) analyzing the training sensory data may detect dynamic objects and may learn their mobility patterns. The flight planner 220 may update the mobility model 222 with the learned mobility patterns.

As shown at 106, the flight planner 220 may update the mobility model 222 to include one or more of the identified mobility pattern(s). The mobility model 222 may be generated to represent static objects detected in the certain geographical area, for example, roads, streets, sidewalks, buildings, landmarks, vegetation and/or the like based on analysis of data depicting the certain geographical area, for example, map(s) of the certain geographical area, model(s) of the certain geographical area, the sensory data (e.g. images, video, depth data, etc.) captured for the certain geographical area and/or the like. Complementing the mobility model to include the mobility pattern(s) may therefore result in a comprehensive model generated and adapted for the certain geographical area to predict movement of the dynamic objects in the certain geographical area based on the identified and learned mobility patterns of the dynamic objects detected in the certain geographical area.

Optionally, the flight planner 220 adjusts the mobility model 222 according to one or more area restrictions applicable for the certain geographical area, specifically a no fly zone, a safe flight zone and/or the like. The no fly zone restriction may define that no drones are allowed to fly in the respective no fly zone. The safe flight zone restriction may define that drones in which the drone is allowed to fly with no restrictions, for example, fly at any time, no minimum flight height, no maximum flight speed, and/or the like. The no fly zone and/or safe flight zone restrictions may further define an aerial perimeter at a predefined distance from the respective zone in which the restriction applies. For example, a certain area restriction may define that a certain high voltage power lines area is a no fly zone which is restricted for drones entry and flight. In another example, a certain area restriction may define that a certain military facility is a no fly zone which is restricted for drones entry and flight. In another example, a certain area restriction may define that a certain above river area is a safe flight zone in case the river is restricted for entry and travel of any of the dynamic objects.

Optionally, the flight planner 220 adjusts the mobility model 222 according to one or more of the environmental conditions identified in the certain geographical area such that the mobility patterns defined in the mobility model 222 are correlated, dependent and/or adjusted according to the environmental condition(s) identified and/or predicted for the certain geographical area. For example, assuming the weather at the certain geographical area is rainy the flight planner 220 may set the mobility model 222 to reflect the mobility pattern(s) identified for the rainy weather. In another example, assuming the time of the day at the certain geographical area is night the flight planner 220 may set the mobility model 222 to reflect the mobility patter(s) identified for the night time and/or for dark light conditions. In another example, assuming the day of the week is a weekend (e.g. Saturday, Sunday) the flight planner 220 may set the mobility model 222 to reflect the mobility patter(s) identified for weekends.

Optionally, the flight planner 220 adjusts the mobility model 222 according to one or more of the flight planning rules to ensure compliance of the flight of the drone 204 with one or more regulation restrictions, for example, a privacy right, a noise restriction and/or the like which may apply in the certain geographical area. For example, the flight planner 220 may generate a certain flight planning rule to define that a certain distance from a certain private residential area is not allowed for drone flying in order not to violate the privacy right of residents living in the certain private residential area. In another example, the flight planner 220 may generate a certain flight planning rule to define that a drone is permitted to fly at a certain distance from the private residential area to maintain the safety space while turning off a camera mounted on the drone to avoid violating the privacy right of the residents. In another example, the flight planner 220 may generate a certain flight planning rule to define that a certain school area is not allowed for drone flight in order not to violate the noise restriction for the school. Moreover, the flight planner 220 may further define the certain flight planning rule to apply during school activity hours while discarding this certain flight planning rule during non-activity times of the school.

Optionally, the flight planner 220 adjusts the mobility model 222 to apply one or more of the mobility patterns for predicting movement of one or more dynamic objects which may emerge from one or more entry points detected in the certain geographical area. The flight planner 220 may detect the entry points, for example, a doorway, a hallway, a street corner and/or the like based on the analysis of the sensory data, for example, the image processing, the depth data analysis, the blobs analysis and/or the like. The mobility model 222 may therefore map one or more of the mobility patterns to one or more of the entry points in order to predict movement of dynamic objects which may potentially emerge from the entry point(s).

For example, the flight planner 220 may map a mobility pattern defining movement of pedestrians walking on a certain sidewalk leading from a bus station to the bus station entry point in order to predict the movement of one or more pedestrians emerging from the bus station entry. The flight planner 220 may map the pedestrians movement mobility pattern to the bus station entry point based on analysis of the sensory data correlating between a bus stopping at the bus station and the depicting the pedestrians movement out of the station entry. The flight planner 220 may further adjust the mobility model 222 to map the mobility pattern to the bus station entry point according to the temporal parameter(s), i.e. timing identified for one or more buses stopping at the bus station. The flight planner 220 may identify the bus(s) stop(s) timing based on the analysis of the sensory data depicting the bus station over the prolonged period of time. Additionally and/or alternatively, the flight planner 220 identifies the bus(s) stop(s) timing based the on public transportation data, specifically timetable information collected from one or more of the remote network resources 240, for example, a public transportation database, a municipal database and/or the like. In another example, the flight planner 220 may map a mobility pattern defining movement of certain public bus riding through a certain street to a certain street corner entry point in order to predict the movement of the certain public bus emerging from around the corner. The flight planner 220 may further adjust the mobility model 222 to map the mobility pattern to the bus station entry point according to the temporal parameter(s), i.e. timing identified for one or more buses stopping at the bus station. The flight planner 220 may identify the bus(s) stop(s) timing based on the analysis of the sensory data depicting the bus station over the prolonged period of time. Moreover, the flight planner 220 may adjust the mobility model 222 to associate the certain public bus mobility pattern with the certain street corner based on the temporal parameter(s), i.e. the timing of the certain public bus such that the certain public bus mobility pattern may apply for times when the certain public bus may emerge from around the corner as dictated by the timetable and may be discarded for other times.

Moreover, one or more of the machine learning algorithms may be trained with training datasets comprising sensory data depicting, for example, urban areas, specifically, potential entry points detected in the urban areas, for example, the street corners. The machine learning algorithm(s) may identify mobility patterns of one or more of the dynamic objects and may further correlate these mobility patterns with one or more of the potential entry points. As such, while generating and/or updating the mobility model 22 for the certain geographical area, specifically an urban area, the flight planner 220 may apply the trained machine learning algorithm(s) to correlate the learned mobility patterns with potential entry points identified in the certain geographical area.

As shown at 108, the flight planner 220 generates a planned flight path (flight plan) for one or more of the drones 204 planned to fly in the certain geographical area. In particular, the flight planner 220 plans the flight path to maintain a predefined safety space between the drone 204 and dynamic object(s) which may be present in the certain geographical area. The safety space is predefined to prevent damage and/or injury to the dynamic object(s) which may result from, for example, a collision with the drone 204, a hit of part(s) (e.g. rotor, body, etc.) disintegrated from the drone 204, a hit of part(s) of another object (e.g. building, power pole, communication tower, traffic sign, etc.) disintegrated as result of a collision with the drone 204 and/or the like. The flight path may define a tubular space along the planned flight path having predefined boundaries in the vertical axis and/or in the horizontal axis (with respect to the ground) in which the drone is permitted to fly. As such the drone may adjust its flight path during its flight to avoid obstacles, specifically to avoid colliding with dynamic object(s) detected in real-time along the planned flight path while remaining within the tubular space defined by the planned flight path.

The flight planner 220 generates the planned flight path for the drone(s) 204 based on the mobility model 222, specifically according to one or more of the mobility patterns defined in the mobility model 222. For example, the flight planner 220 may plan the flight path to maintain the predefined safety space by preventing the drone 204 from flying over a certain sidewalk in the certain geographical area which according to a certain mobility pattern is used by one or more pedestrians. In another example, the flight planner 220 may plan the flight path to maintain the predefined safety space by selecting a flight path over a certain area in the certain geographical area which according to a certain mobility pattern is not occupied by dynamic objects.

Optionally, the flight planner 220 generates, adjusts and/or adapts the planned flight path according to one or more of the area restrictions defined in the mobility model 222. For example, the flight planner 220 may adjust the planned flight path to prevent the drone 204 from flying in a certain no fly zone defined by a certain area restriction. In another example, the flight planner 220 may adjust the planned flight path to set the flight path of the drone 204 to go over a certain safe flight zone defined by a certain area restriction.

Optionally, the flight planner 220 generates, adjusts and/or adapts the planned flight path according to one or more of the temporal parameters applicable for the planned time of flight of the drone 204 in the certain geographical area. Specifically, the flight planner 220 may adjust the planned flight path according to one or more mobility patterns correlated with the temporal parameter(s). For example, assuming the drone 204 is planned to fly in the certain geographical area at night time. In such case the flight planner 220 may adjust the planned flight path according to one or more of the mobility patterns correlated with night time and/or darkness. In another example, assuming the drone 204 is planned to fly in the certain geographical area during a weekend. In such case the flight planner 220 may adjust the planned flight path according to one or more of the mobility patterns correlated with weekends.

Optionally, the flight planner 220 generates, adjusts and/or adapts the planned flight path according to one or more of the environmental conditions identified and/or predicted for the certain geographical area for the planned time of flight of the drone 204. Specifically, the flight planner 220 may adjust the planned flight path according to one or more mobility patterns correlated with the environmental condition(s) as defined in the mobility model 222. For example, assuming the drone 204 is planned to fly in the certain geographical while it is raining. In such case the flight planner 220 may adjust the planned flight path according to one or more of the mobility patterns correlated with rainy weather. In another example, assuming the drone 204 is planned to fly in the certain geographical on a sunny day during high sun hours. In such case the flight planner 220 may adjust the planned flight path according to one or more of the mobility patterns correlated with sun exposure.

Optionally, the flight planner 220 generates, adjusts and/or adapts the planned flight path according to one or more of the flight planning rules defined in the mobility model 222 in order to comply with the regulation(s) restrictions. For example, the flight planner 220 may adjust the planned flight path to prevent the drone 204 from flying within the predefined distance from the certain residential area to ensure compliance of the privacy right of the residents. In another example, the flight planner 220 may adjust the planned flight path to prevent the drone 204 from flying within the predefined distance from the certain school to ensure compliance of the noise restriction regulation.

Optionally, the flight planner 220 may generate, adjust and/or adapt the planned flight path to follow an elevated path tracking a movement path of a human dynamic object as defined by the mobility model 222, specifically based on analysis of one or more of the mobility patterns identified for one or more humans, e.g. a pedestrian, a worker and/or the like. Adapting the flight plan according to the movement path of a human dynamic object may serve to avoid obstacles typically avoided by humans, for example, structures, power line poles (and hence power lines) and/or the like. Moreover, this may serve to prevent damage in case of a malfunction of the drone 204 which may lead to a crash of the drone 204. For example, the flight planner 220 may adapt the planned flight path to instruct the drone 204 to maintain a relatively low flight altitude such that in case of a crash the damage inflicted by the drone 204 may be significantly reduced. In another example, the flight planner 220 may adapt the planned flight path to instruct the drone 204 to maintain a relatively high flight altitude such that in case of a malfunction of the drone 204, sufficient time may be available to operate and/or maneuver the drone 204 to avoid heating the dynamic objects such as the pedestrians, the vehicles and/or the like.

Optionally, the flight planner 220 may generate, adjust and/or adapt the planned flight path to dictate one or more emergency actions the drone 204 is directed to apply in case of an emergency situation in which the drone 204 is unable to maintain the planned flight path. For example, a certain emergency action dictated by flight planner 220 for the drone 204 to apply in case of an emergency situation is an immediate emergency landing. In another example, a certain emergency action dictated by the flight planner 220 for the drone 204 to apply in case of an emergency situation is moving to a predefined altitude, specifically at a predefined height ensuring that the drone 204 cannot inflict damage and/or injury to the dynamic object(s). The flight planner 220 may calculate the predefined altitude based on the mobility model 222, specifically based on the static object(s) information (e.g. location, dimensions, height, etc.) and/or based on the mobility patterns predicting the movement of dynamic object(s) predicted to be in the certain geographical area during the flight time of the drone 204. In another example, a certain emergency action dictated by the flight planner 220 for the drone 204 to apply in case of an emergency situation is operating one or more collision measures, for example, an airbag, a rigid foam spray and/or the like. Operating the collision measure(s) action may be applied by the drone 204 in case, for example, collision of the drone 204 with one or more of the dynamic objects is unavoidable, inevitable and/or highly probable. In another example, a certain emergency action dictated by the flight planner 220 for the drone 204 to apply in case of an emergency situation is operating one or more signaling measures to indicate presence of the drone 204 to the dynamic objects. For example, the drone 204 may directed to operate a flashing light, generate a sound and/or the like to indicate its presence to the dynamic objects, for example, pedestrians to allow the pedestrians to take precautionary action(s).

The flight planner 220 may define one or more of the emergency actions based on data collected for the certain geographical area, for example, the map(s) of the geographical area, the model of the certain geographical area, imagery data of the certain geographical area and/or the like. For example, based on analysis of the map(s) of the certain geographical area, the flight planner 220 may identify one or more locations, for example, a roof top, a parking lot and/or the like along the planned flight path which may be suitable for an immediate emergency landing. The flight planner 220 may therefore adjust the planned flight path to dictate that in case the drone 204 encounters an emergency situation in close (predefined) proximity to one or more of the location(s) identified as suitable for the emergency landing, the drone 204 should immediately land at one of these suitable location(s). In another example, based on analysis of the map(s) of the certain geographical area, the flight planner 220 may identify the height of static objects, for example, building(s), power line(s), communication tower(s) and/or the like along the flight path planned for the drone 204. The flight planner 220 may therefore adjust the planned flight path to dictate that in case the drone 204 encounters an emergency situation in a certain location along its path, the drone 204 should move to a minimum altitude calculated by the flight planner 220 based on the height of static objects identified in the certain location.

The flight planner 220 may further define one or more of the emergency actions based on the public transportation data, specifically the timetable information collected from one or more of the remote network resources 240, for example, the public transportation database, the municipal database and/or the like. For example, based on analysis of the public transportation data, the flight planner 220 may identify one or more public buses predicted to be located along the flight path planned for the drone 204. In such case, the flight planner 220 may adjust the planned flight path to dictate that in case the drone 204 encounters an emergency situation in close (predefined) proximity to the public bus detected by the drone 204, the drone 204 should immediately land on the detected public bus.

According to some embodiments of the present invention, the flight path planning system 202 executing the flight planner 220 is integrated and/or mounted in one or more drones 204. In such case, the planned flight path generated for the drone 204 may be created and/or adjusted by the flight planner 220 based on the mobility model 222 while the drone 204 is in flight. In particular, the flight planner 220 generates and/or adjusts one or more segments of the flight path for a future route of the drone 204 during the current flight based on the mobility model 222 which may be locally stored in the drone 204. For example, the flight planner 220 may generate and/or adjust a planned flight path segment for a route which the drone 204 is instructed to follow in 10 seconds. In another example, the flight planner 220 may generate and/or adjust a planned flight path segment for a route which the drone 204 is instructed to follow in 5 minutes. In another example, the flight planner 220 may generate and/or adjust a planned flight path segment for a route which the drone 204 is instructed to follow in one hour.

Optionally, the mobility model 222 is updated, for example, by the flight planner 220 while the drone is in flight. The flight planner 220 may generate, update and/or adjust one or more of the mobility patterns of the mobility model 222 identified based on an analysis of sensory data captured during the current flight by one or more sensors such as the sensors 250 mounted on the drone 204, for example, an imaging sensor, a LiDAR sensor, a RADAR sensor, a SONAR sensor and/or the like.

The path planning system 202 integrated in the drone(s) 204 may be utilized, for example, by a dedicated path planning system 202 deployed in the drone(s) 204. The integrated path planning system 202 may communicate via one or more I/O and/or network communication channels with one or more control units of the drone(s) 204 controlling the movement and flight of the drone(s) 204, for example, a flight control system, a navigation system and/or the like. In another example, the functionality of the path planning system 202 may be utilized by one or more existing systems, devices and/or components of the drone(s) 204 which may execute the flight planner 220.

As shown at 110, the flight planner 220 may output the planned flight path to the drone(s) 204. For example, the flight planner 220 may transmit the planned flight path to the drone(s) 204 planned to fly in the certain geographical area through the I/O interface 210 . . . . In another example, through the I/O interface 210, the flight planner 220 may download the planned flight path to one or more pluggable storage devices, for example, a USB memory media, a Flash card, a wireless storage media and/or the like. The pluggable storage device(s) may be used, for example, plugged and/or the like to the drone(s) 204 which may upload the planned flight path from the pluggable storage device(s). The drone(s) 204 may apply the planned flight path and set their flight path in the certain geographical area according the flight plan.

In case of the flight path planning system 202 integrated and/or mounted in the drone(s) 204, the flight planner 220 may provide, output, transfer and/or transmit the like the adjusted planned flight path to one or more control systems of the drone 204, for example, the flight control system, the navigation system and/or the like which may apply the adjusted planned flight path to guide the drone 204 during the current flight in the certain geographical area.

According to some embodiments of the present invention, the flight planner 220 executing a process such as the process 100 on the flight path planning system 202 may plan in advance a flight path for one or more of the drones 204 planned to fly in the certain (first) geographical area based on a mobility model generated based on sensory data captured in one or more other (second) geographical area having one or more area characteristics similar to the certain geographical area.

The area characteristic(s) may be identified by analyzing the captured sensory data, and/or by analyzing the documented data relating to the certain geographical area and/or to the other geographical area(s), for example, map(s), model(s) and/or the like. The area characteristics may include one or more general area characteristics, for example, an urban area, a rural area, a residential area, a commercial area, a business district, an industrial area and/or the like. The area characteristics may further include one or more static objects characteristics, for example, building types, streets structure, power lines deployment and/or the like. The area characteristics may also include one or more dynamic objects characteristics, for example, vehicles traffic density, pedestrians' volume, public transportation vehicles and/or the like.

Similarly to the process 100, specifically as described for steps 102 and 104, the flight planner 220 may receive sensory data captured by sensors such as the sensors 250 deployed to monitor the other geographical area(s) and analyze the captured data to identify, set and/or learn one or more mobility patterns characteristic to the other geographical area(s).

The flight planner 220 may further follow the process 100, specifically step 106 to generate and/or update the mobility model 222 to include the mobility patterns of the other geographical area(s).

Since flight planner 220 needs to generate the flight path for the drone(s) 204 planned to fly in the certain geographical area, the flight planner 220 may correlate the certain geographical area with one or more of the mobility model(s) generated for one or more of the other geographical areas. The flight planner 220 may apply this correlation by comparing the area characteristics identified for the certain geographical area with the area characteristics of the other geographical area(s) and identifying potential match(es). For example, assuming that based on the documented data relating to the certain geographical area, the flight planner 220 identifies that the certain geographical area is an urban area and more specifically a commercial area populated with a shopping mall and multiple nearby streets in which various shops and stores are located. The flight planner 220 may correlate the certain geographical area with one or more other areas which present similar commercial area characteristics and may apply the mobility model of the other geographical area(s) and/or part thereof for the certain geographical area. In another example, sensory data may be captured for the certain geographical area by one or more drone mounted sensors such as the sensor 250B1 mounted on a drone conducting a limited number of flights over the certain geographical area, for example, a single flight or a few flights. Assuming, that base on analysis of the sensory data captured at the certain geographical area, the flight planner 220 identifies that the certain geographical area is a business district populated with multiple office buildings and public transportation stations. The flight planner 220 may correlate the certain geographical area with one or more other areas which present similar business area characteristics and may apply the mobility model of the other geographical area(s) and/or part thereof for the certain geographical area.

Moreover, the flight planner 220 may generate one or more mobility patterns for the certain geographical area by applying one or more of the trained machine learning algorithms which identified mobility patterns for other geographical area(s) having area characteristics similar to these of the certain geographical area. The machine learning algorithm(s) which are trained with the sensory data captured at the other geographical area(s) may be applied to the sensory data captured at the certain geographical area to generate the mobility pattern(s) for the certain geographical area. For example, assuming the certain geographical area is a residential area, the flight planner 220 may apply machine learning algorithm(s) trained for other residential area(s) having similar area characteristic(s) as the certain geographical area in order to generate mobility pattern(s) for the certain residential area.

Since the certain geographical area shares area characteristics with the other geographical area(s), the mobility model 222 constructed by the flight planner 220 for the other geographical area(s) may be highly accurate for predicting the dynamic objects movement in the certain geographical area.

As described for the process 100, specifically for step 108, based on the mobility model 222 constructed for the other geographical area(s) and applied to the certain geographical area, the flight planner 220 may generate one or more flight paths for one or more of the drones 204 planned to fly in the certain geographical area.

As described for the process 100, specifically for step 110, the flight planner 220 may output the planned flight path to be used by the drone(s) 204.

It is expected that during the life of a patent maturing from this application many relevant systems, methods and computer programs will be developed and the scope of the terms sensor technology, machine learning algorithm are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of planning a drone flight path to increase safety of dynamic objects the drone is estimated to encounter along the flight path based on a mobility model constructed to predict movement of dynamic objects, comprising:
creating an updated mobility model predicting movement of dynamic objects in a certain geographical area by:
receiving sensory data captured over time by at least one sensor monitoring movement of a plurality of said dynamic objects in said certain geographical area;
analyzing the sensory data to identify at least one mobility pattern of at least one of the plurality of dynamic objects detected in the certain geographical area;
updating said mobility model with the at least one mobility pattern;
adjusting the at least one mobility pattern in the mobility model according to at least one temporal parameter and according to at least one environmental condition associated with the movement of the at least one dynamic object; and
generating a planned flight path based on the mobility model for at least one drone planned to fly in another geographical area different than the certain geographical area and sharing the at least one area characteristic with the at least one geographical area, the flight path is used by one or more control units controlling the drone to maintain the drone in a predefined safety space between the at least one drone and at least one other dynamic object in the another geographical area.

2. The computer implemented method of claim 1, wherein the planned flight path defines a tubular space along having predefined boundaries in at least one of: a vertical axis and a horizontal axis with respect to ground in which the drone is permitted to fly.

3. The computer implemented method of claim 1, wherein the predefined safety space is defined to prevent damage to the at least one other dynamic object resulting from at least one of: a collision with the at least one drone, a hit of at least one part disintegrated from the at least one drone and a hit of at least one part of another object disintegrated as result of a collision with the at least one drone.

4. The computer implemented method of claim 1, wherein the at least one dynamic object is a member of a group consisting of: a human, an animal, a vehicle, machinery and a moving road infrastructure object.

5. The computer implemented method of claim 1, wherein the at least one sensor is a member of a group consisting of: an imaging sensor, a laser detection and ranging (LiDAR) sensor, a radio detection and ranging (RADAR) sensor and a sound navigation and ranging (SONAR) sensor.

6. The computer implemented method of claim 1, wherein the at least one sensor is statically deployed in the certain geographical area.

7. The computer implemented method of claim 1, wherein the at least one sensor is mounted in at least one aerial vehicle flying over the certain geographical area, the at least one aerial vehicle is a member of a group consisting of: a drone, an unmanned aerial vehicle, a manned aerial vehicle and a satellite.

8. The computer implemented method of claim 1, wherein the at least one identified mobility pattern defines at least one of: a location, a direction and a speed.

9. The computer implemented method of claim 1, wherein the at least one temporal parameter is a member of a group consisting of: a time of day, a day of week and a date.

10. The computer implemented method of claim 1, wherein the at least one environmental condition is a member of a group consisting of: a temperature and a weather condition.

11. The computer implemented method of claim 1, further comprising the analysis of the sensory data includes at least one machine learning algorithm applied to the sensory data for detecting the at least one mobility pattern.

12. The computer implemented method of claim 1, further comprising adjusting the mobility model according to at least one area restriction in the certain geographical area, the at least one area restriction is a member of a group consisting of: a no fly zone in which the drone is not allowed to fly and a safe flight zone in which the drone is allowed to fly with no restrictions.

13. The computer implemented method of claim 1, further comprising adjusting the mobility model according to at least one flight planning rule predefined to ensure compliance of the flight path with at least one regulation restriction, the at least one regulation restriction is a member of a group consisting of: a privacy right, a noise restriction and a public safety.

14. The computer implemented method of claim 1, further comprising adjusting the mobility model to include at least one mobility pattern of at least one dynamic object which potentially emerges from at least one entry point detected in the certain geographical area based on the analysis of the sensory data, the at least one entry point is a member of a group consisting of: a doorway, a hallway and a street corner.

15. The computer implemented method of claim 1, further comprising adjusting the flight plan to follow an elevated path tracking a human movement path defined by the mobility model.

16. The computer implemented method of claim 1, further comprising constructing the flight plan to define at least one emergency action to be applied by the at least one drone in case the predefined safety space cannot be maintained, the at least one emergency action is a member of a group consisting of: an immediate emergency landing, moving to a predefined altitude, operating at least one collision measure and operating at least one signaling measure to indicate presence of the drone.

17. The computer implemented method of claim 16, wherein the at least one emergency action is defined according to at least one of: a map of the certain geographical area, a model of the certain geographical area, a plan of public transportation in the certain geographical area and the analysis of the sensory data captured in the certain geographical area.

18. The computer implemented method of claim 1, wherein at least one segment of the planned flight path is generated by the at least one drone while in flight based on the mobility model, the at least one segment of the planned flight defines a future route of the at least one drone during the current flight.

19. The computer implemented method of claim 18, wherein the mobility model is updated according to sensory data captured during the current flight by at last one sensor mounted on the at least one drone.

20. The computer implemented method of claim 1, wherein said mobility model includes information relating to a plurality of static objects present in the certain geographical area and is enhanced by including predicted movement of the at least one other dynamic objects predicted to be present in the certain geographical area.

21. A system for planning a drone flight path to increase safety of dynamic objects the drone is estimated to encounter along the flight path based on a mobility model constructed to predict movement of dynamic objects, comprising:
  a program store storing a code; and
  at least one processor coupled to the program store for executing the stored code, the code comprising:
    code instruction to create an updated mobility model predicting movement of a plurality of dynamic objects in a certain geographical area by:
      receiving sensory data captured over time by at least one sensor monitoring movement of said plurality of dynamic objects in said certain geographical area,
      analyzing the sensory data to identify at least one mobility pattern of at least one said plurality of dynamic objects detected in the certain geographical area,
      updating said mobility model with the at least one mobility pattern,
      adjusting the at least one mobility pattern in the mobility model according to at least one temporal parameter and according to at least one environmental condition associated with the movement of the at least one dynamic object; and
    code instruction to generate a planned flight path based on the mobility model for at least one drone planned to fly in another geographical area different than the certain geographical area and sharing the at least one area characteristic with the at least one geographical area, the flight path is planned to be used by one or more control units to maintain a predefined safety space between the at least one drone and at least one other dynamic object in the another geographical area.

22. A computer implemented method of planning a drone flight path to increase safety of dynamic objects the drone is estimated to encounter along the flight path based on a mobility model constructed to predict movement of dynamic objects, comprising:
  creating an updated mobility model predicting movement of dynamic objects in at least one geographical area by:
    receiving sensory data captured over time by at least one sensor monitoring movement of a plurality of said dynamic objects in the at least one geographical area characterized by at least one area characteristic;
    analyzing the sensory data to identify at least one mobility pattern of at least one dynamic object detected in the at least one geographical area;
    updating said mobility model with the at least one mobility pattern; and
  generating a planned flight path based on the mobility model for at least one drone planned to fly in another geographical area different than said at least one geographical area and sharing the at least one area characteristic with the at least one geographical area, the flight path is planned to be used by one or more control units to maintain a predefined safety space between the at least one drone and at least one other dynamic object in the another geographical area.

23. The computer implemented method of claim 22, further comprising correlating the other geographical area with the mobility model generated for the at least one geographical area by comparing at least one area characteristic identified for the other geographical area with the at least one area characteristics of the at least one geographical area for identifying at least one potential match.

* * * * *